(12) United States Patent
Itoi et al.

(10) Patent No.: US 8,972,094 B2
(45) Date of Patent: Mar. 3, 2015

(54) MINING MACHINE MOVEMENT MANAGEMENT SYSTEM

(75) Inventors: Takashi Itoi, Hiratsuka (JP); Tadashi Taninaga, Fujisawa (JP); Hisataka Fukasu, Fujisawa (JP); Takahiro Ueda, Maebashi (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 13/825,207

(22) PCT Filed: Sep. 13, 2012

(86) PCT No.: PCT/JP2012/073542
§ 371 (c)(1),
(2), (4) Date: Aug. 14, 2013

(87) PCT Pub. No.: WO2013/065412
PCT Pub. Date: May 10, 2013

(65) Prior Publication Data
US 2014/0297091 A1    Oct. 2, 2014

(30) Foreign Application Priority Data

Nov. 4, 2011  (JP) ................................. 2011-242845

(51) Int. Cl.
*G01C 22/00* (2006.01)
*G05D 1/02* (2006.01)
(Continued)

(52) U.S. Cl.
CPC .......... *G05D 1/0276* (2013.01); *H04Q 2209/40* (2013.01); *G07C 5/008* (2013.01); *G06Q 50/02* (2013.01)
USPC ............... 701/24; 701/2; 701/29.3; 701/31.5; 701/32.3; 340/853.2; 340/438; 340/439; 340/505

(58) Field of Classification Search
CPC ..... H04Q 9/00; H04Q 2209/40; G07C 5/008; E21B 7/022; E21B 44/00; G06Q 50/02
USPC ...................... 701/2, 24, 36, 29.3, 32.3, 31.5; 340/853.2, 854.6, 438, 439, 505
See application file for complete search history.

(56) References Cited

U.S. PATENT DOCUMENTS 7,941,158 B2    5/2011  Olson
8,330,593 B2 *  12/2012 Golenski ....................... 340/438
(Continued)

FOREIGN PATENT DOCUMENTS

CA    2683357 A1    4/2010
JP    07-211464 A    8/1995
(Continued)

OTHER PUBLICATIONS

Decision of a Patent Grant dated Apr. 1, 2014, issued for the corresponding Japanese patent application No. 2011-242845 and English translation thereof.
Office Action dated Oct. 8, 2014, issued for the corresponding Canadian patent application No. 2,810,584.

*Primary Examiner* — Gertrude Arthur Jeanglaude
(74) *Attorney, Agent, or Firm* — Locke Lord LLP (57) ABSTRACT

An information collection device transmits a position information request command for requesting transmission of position information of a dump truck at a predetermined point in time via a second wireless communication device and determines a state of at least one of the dump truck, a relay that relays communication from a first wireless communication device included in the dump truck to the second wireless communication device, and a travel route of the dump truck based on a response to the position information request command.

6 Claims, 8 Drawing Sheets

(51) Int. Cl.
*G06Q 50/02* (2012.01)
*G07C 5/00* (2006.01)

(56) References Cited

U.S. PATENT DOCUMENTS

| 8,836,534 | B2 * | 9/2014 | Field | 340/853.2 |
|---|---|---|---|---|
| 2008/0068147 | A1 | 3/2008 | Mori et al. | |

FOREIGN PATENT DOCUMENTS

| JP | 11-024744 A | 1/1999 |
|---|---|---|
| JP | 2003-046423 A | 2/2003 |
| JP | 2004-186766 A | 7/2004 |
| JP | 2008-074163 A | 4/2008 |
| JP | 2011-091678 A | 5/2011 |

\* cited by examiner

| | DATE AND RELAY COUNT | | | |
|---|---|---|---|---|
| RELAY | y1.m1.d29 | y1.m1.d30 | y1.m2.d1 | |
| 3D | 41 | 39 | 42 | ⎫ |
| 3E | 55 | 62 | 4 | ⎬ RELAY COUNT |
| 3F | 36 | 37 | 35 | |
| 3G | 22 | 19 | 0 | ⎭ |
| ⋮ | ⋮ | ⋮ | ⋮ | |

RELAY COUNT

FIG.9

| | DATE AND BROADCAST RELAY COUNT | | | |
|---|---|---|---|---|
| RELAY | y1.m1.d29 | y1.m1.d30 | y1.m2.d1 | |
| 3E | 40,001 | 43,652 | 38,762 | ⎫ BROADCAST RELAY COUNT |
| 3G | 22,622 | 20,052 | 0 | ⎭ |

BROADCAST RELAY COUNT

FIG.10

MINING MACHINE MOVEMENT MANAGEMENT SYSTEM

FIELD

Techniques disclosed in the present invention relate to a mining machine movement management system, and in particular, to a wireless communication device, an information collection device, and a state monitoring system for monitoring the state of a travel route of a mining machine.

BACKGROUND

In a mine, various construction machines such as an excavator or a dump truck operate. In recent years, the operation information of construction machines is acquired via wireless communication and the movement of the construction machine is managed. For example, Patent Literature 1 discloses a mobile communication device in which a mobile vehicle includes a determination means that determines whether the mobile vehicle moves from the inside of a communication area to approach the outside of the communication area, and when the determination means determines that the mobile vehicle approaches the outside of the communication area, information on the determination result is transmitted to a terminal device via a communication means.

CITATION LIST

Patent Literature

Patent Literature 1: Japanese Laid-open Patent Publication No. 2003-46423

SUMMARY

Technical Problem

In the related art, in order to manage the movement of construction machines, operation information is collected and stored in a storage device of each construction machine, and a serviceman or the like performs an operation of accessing each construction machine to download the operation information. However, the downloading operation on a plurality of construction machines is troublesome, and the operation of managing the operation information is not realized sufficiently on a realtime basis. Thus, the operation information of each construction machine is acquired using a wireless communication means, and the movement of the construction machines is managed. In a case where a construction machine operates in a mine, since a mine is generally extremely large, a plurality of relays for acquiring the operation information held in a mining machine, which is one type of a construction machine called a dump truck, from the mining machine via wireless communication is disposed in a place that is different from a management facility that includes a management device. Moreover, in mines, a mining machine that has a trouble and may not operate or a mining machine that causes a severe trouble because no treatment is given to the mining machine which has not reached a failure but requires maintenance or inspection becomes the cause that decreases the productivity of a mine. Thus, it is necessary to perform the movement management of mining machines on a realtime basis as much as possible to perform preventive maintenance and discover faults as early as possible. For this to be realized, it is indispensable to guarantee that devices such as a wireless communication device mounted on a mining machine and wireless communication devices such as relays disposed in a mine operate normally. From the background described above, it is important to guarantee that devices such as a wireless communication device mounted on a mining machine used in a mine or wireless communication devices such as relays function normally, and to perform state monitoring to see whether an abnormality such as a trouble occurs. Further, even if no abnormality occurs in relays, the movement management of mining machines may not be performed accurately unless the determination on whether arrangement positions of the relays will be changed according to a change in a travel route of a mining machine is performed on a realtime basis as much as possible.

Further, since devices such as wireless communication devices used in mines are used under harsh conditions, a means that monitors the state of devices such as wireless communication devices and detects an abnormality may become unable to monitor the state and detect the abnormality due to its own trouble. Thus, it is preferable that such a means is not incorporated into the devices such as wireless communication devices. In the mobile communication device disclosed in Patent Literature 1, a mobile vehicle includes a communication means and a determination means that determines whether the mobile vehicle moves from the inside of a communication area to approach the outside of the communication area. When it is determined that the mobile vehicle approaches the outside of the communication area, information indicating that "approach to the outside of the communication area" is transmitted to a terminal device via the communication means. When the mobile vehicle becomes unable to communicate with the terminal device, the cause of the inability to communicate can be specified as "outside the communication area." In other cases, the cause is specified as "trouble in the communication means such as an antenna." However, in the mobile communication device disclosed in Patent Literature 1, when a failure occurs in wireless communication during monitoring of the state of devices such as wireless communication devices used in a mine, it is not possible to determine whether the failure is caused by a trouble in the devices such as wireless communication devices of a mining machine or by a trouble in relays.

An object of the present invention is at least to accurately monitor the state of devices such as in-vehicle wireless communication devices or relays used in mines or to accurately monitor the state of a travel route.

Solution to Problem

According to the present invention, a mining machine movement management system comprises: an in-vehicle information collection device that is mounted on a mining machine to collect operation information on an operation state of the mining machine; a first wireless communication device that is mounted on the mining machine to perform communication; and an information collection device that collects the operation information via a second wireless communication device that communicates with the first wireless communication device, wherein the information collection device transmits a position information request command for requesting transmission of position information of the mining machine to the mining machine at a predetermined point in time via the second wireless communication device, and the information collection device determines a state of at least one of a device mounted on the mining machine, a relay that relays communication from the first wireless communication device to the second wireless communication device, and a travel route of the mining machine based on a response from the mining machine with respect to the position information request command.

In the present invention, it is preferable that the information collection device determines an abnormality in the in-vehicle wireless communication device based on the number of times in which the response is received.

In the present invention, it is preferable that the information collection device specifies a relay that has relayed the operation information from the position information of the mining machine and a received time of the operation information, included in the response at a point in time when the operation state of the mining machine is received, and the information collection device determines an abnormality in the specified relay based on the number of times in which the specified relay has relayed the operation information.

In the present invention, it is preferable that when the number of times in which the specified relay has relayed the operation information decreases with time, the information collection device determines presence of an abnormality in the specified relay or presence of a change in the travel route of the mining machine based on the number of times in which the specified relay has relayed the response.

In the present invention, it is preferable that the information collection device determines whether the travel route of the mining machine has changed based on a change in speed with time of the mining machine.

In the present invention, it is preferable that when an abnormality has not occurred in the specified relay, the information collection device determines presence of an abnormality in the device mounted on the mining machine based on the operation information and the response.

According to the present invention, it is possible to accurately monitor the state of devices such as in-vehicle wireless communication devices or relays used in mines or to accurately monitor the state of a travel route.

DESCRIPTION OF EMBODIMENTS

A mode (embodiment) for embodying the present invention will be described in detail with reference to the drawings. The present invention is not limited to the content described in the following embodiment. Moreover, constituent components described below include substantially the same components that can easily occur to those skilled in the art. Further, the constituent components described below can be appropriately combined. In addition, various omissions, substitutions, or changes in the constituent components can be made without departing from the spirit of the present invention.

First Embodiment

Figure 1:
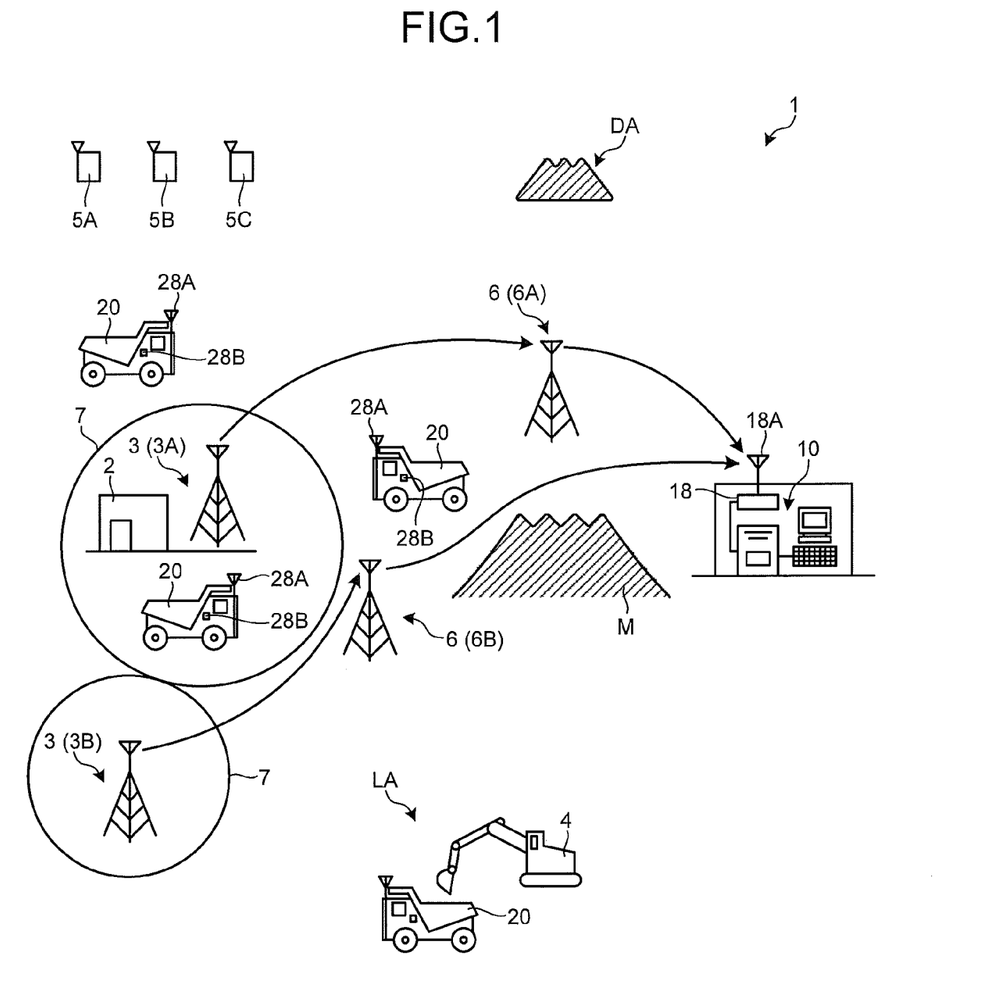
FIG. 1 is a view illustrating an entire mining machine movement management system according to a first embodiment, which includes a wireless communication device, an information collection device, and a state monitoring system for monitoring the state of a travel route of a mining machine.

FIG. 1 is a view illustrating an entire mining machine movement management system 1 according to the first embodiment, which includes a wireless communication device, an information collection device, and a state monitoring system for monitoring the state of a travel route of a mining machine. The mining machine movement management system 1 is configured to manage an operation state of various mining machines such as a dump truck and an excavator that operate in a mine. The state monitoring system for the wireless communication device and the information collection device incorporated into the mining machine movement management system 1 mainly monitors the state of devices such as wireless communication devices and detects the state of a mine (for example, a change in the position of a discharge area, a change in a travel route, and the like) by monitoring the state of devices such as wireless communication devices. The devices such as wireless communication devices used in a mine mean an in-vehicle information collection device and an in-vehicle wireless communication device mounted on a mining machine, a plurality of relays and a plurality of antennas provided in the mine, and the like, for example. Details of these devices will be described later.

A mining machine is the general term for devices used in various works performed in a mine. In this embodiment, although a dump truck 20 that functions as a delivery vehicle that delivers crushed stone or soil or rocks generated during excavation of crushed stone is used as an example of a mining machine, the mining machine is not limited to this. In a loading area LA of a mine, crushed stone, soil, or the like is loaded onto the dump truck 20 by a loader 4 such as an excavator or a wheel loader. Moreover, the dump truck 20 unloads the loaded stone, soil, or the like to be discharged in a discharge area DA.

<Overview of Mining Machine Movement Management System>

The mining machine movement management system (hereinafter, referred to as a state monitoring system as necessary) 1 is configured such that an information collection device 10 collects the operation information of a mining machine (in this embodiment, the dump truck 20) from each dump truck 20. The information collection device 10 is provided in a management facility of a mine, for example, unlike the dump truck 20 which is a mobile vehicle. As above, it is assumed that the information collection device 10 basically does not move. The operation information of the dump truck 20, collected by the information collection device 10 is information on the operation state of the dump truck 20, and for example, is a travel period, a travel distance, an engine water temperature, presence of abnormality, an abnormal position, a fuel consumption rate, or a load capacity. The operation information is mainly used for preventive maintenance or abnormality diagnosis for the dump truck 20. Thus, the operation information is useful for complying with a demand for improving the productivity of a mine or for improving the operation of a mine.

In order for the information collection device 10 to collect the operation information of each dump truck 20 operating in a mine, the information collection device 10 is connected to a second wireless communication device 18 that has an antenna 18A. The dump truck 20 includes an in-vehicle wireless communication device 27 and a GPS antenna 28A in order to transmit operation information and communicate with the information collection device 10. Moreover, the dump truck 20 can measure its own position by receiving radio signals from global positioning system (GPS) satellites 5A, 5B, and 5C with the aid of the GPS antenna 28B. The position may be measured using other positioning satellites without being limited to the GPS satellite. That is, it is sufficient that positioning can be performed using global navigation satellite systems (GNSS).

The output of the radio signals that the dump truck 20 transmits from the antenna 28A does not have such a communication range that the entire mine can be covered. Moreover, the radio signals transmitted from the antenna 28A may not be transmitted to a distant location over an obstacle such as a high mountain due to the wavelength used. Thus, there is a limit in the coverage of the radio signals that the dump truck 20 transmits from the antenna 28A. Therefore, if the distance between the dump truck 20 and the information collection device 10 is too large, or an obstacle such as a mountain M is present between the dump truck 20 and the information collection device 10, the second wireless communication device 18 may not receive the radio signals transmitted from the dump truck 20. Although such a communication failure can naturally be avoided by using a wireless communication device that can output rear wall surface with high power, it is appropriate to use a communication system such as a wireless local area network (LAN) from the perspective of cost and maintenance. However, since the wireless LAN may not allow long-distance communication although it is ideal for short-distance communication, a special structure is necessary to establish a wireless LAN communication system in a very large mine and to realize satisfactory wireless communication between the dump truck 20 and the information collection device 10. Therefore, the state monitoring system 1 includes a plurality of relays 3 (3A, 3B, and so on) for relaying the radio signals that the dump truck 20 transmits from the antenna 28A to relay the operation information or the like to the second wireless communication device 18. By providing the relays 3 at a plurality of locations in a mine, the information collection device 10 can collect the operation information or the like from the dump trucks 20 that operate at positions distant from the information collection device 10 via wireless communication.

When it is determined that it is designed such that the distance between the arrangement location of the relay 3 and the installed location (management facility) of the second wireless communication device 18 is too long to secure reliable wireless communication, intermediate relays 6 (6A, 6B, and so on) are disposed in order to relay signals between the relay 3 and the second wireless communication device 18. In this embodiment, the intermediate relay 6 relays signals between the relay 3 and the second wireless communication device 18 but does not relay the radio signals that the dump truck 20 transmits from the antenna 28A. In this embodiment, the intermediate relay 6 is configured such that the intermediate relay does not relay radio signals from relays other than the corresponding relay 3. For example, as illustrated in FIG. 1, only one intermediate relay 6A relays the radio signals from the relay 3A of a gas station 2. In FIG. 1, although it is depicted such that the intermediate relay 6 corresponds to one relay 3, the present invention is not limited to such a one-to-one relation, but each intermediate relay 6 can relay the radio signals transmitted from a plurality of relays 3.

A predetermined area (an area indicated by a circle in FIG. 1) around the arrangement location of the relay 3 is a range (that is, a communication range 7) where a first wireless communication device (the in-vehicle wireless communication device 27) mounted on the dump truck 20 can perform wireless communication with the relay 3. The dump truck 20 present in the communication range 7 can perform wireless communication with the second wireless communication device 18 via the relay 3 or the like.

When the information collection device 10 collects the operation information from the dump truck 20 via wireless communication, the operation information from the dump truck 20 is transmitted to the information collection device 10. In this case, when the dump truck 20 travels during transmission of the operation information so that the dump truck 20 moves out of the communication range 7, the communication may be disconnected before all items of the operation information to be transmitted to the information collection device 10 are transmitted. Thus, it is preferable that the dump truck 20 is present in the communication range 7 during a period when the information collection device 10 receives the operation information, in other words, during a period when the dump truck 20 transmits the operation information. However, it is not possible for the driver of the dump truck 20 to drive while being conscious of the communication range 7 that is invisible to the eyes, and even if a means such as a means for displaying the communication range 7 in a map or the like on a display in a driver's cab in the dump truck 20 is devised, it is troublesome for the driver to drive while looking at the displayed map. Thus, it is preferable to perform control such that the operation information is transmitted from the dump truck 20 to the relay 3 in a place where the dump truck 20 makes a stop for a predetermined period (a period equal to or longer than a period in which all items of the operation information to be transmitted can be transmitted) in the communication range 7.

Thus, in this embodiment, the relay 3 is installed in the gas station 2, for example. In the gas station 2, the dump truck 20 is expected to make a stop for a predetermined period in order to refill with fuel for driving the engine of the dump truck 20. Thus, the dump truck 20 can maintain the state of staying in the communication range 7 for a period in which the information collection device 10 can reliably receive the operation information from the dump truck 20 that is refilled with fuel. As a result, the information collection device 10 can reliably collect the operation information from the dump truck 20 via wireless communication. In the case of mines, an example of such a place where the dump truck 20 is expected to make a stop for a predetermined period includes a loading area LA which is a place where a cargo is loaded by the loader 4 such as an excavator and the discharge area DA which is a place where the loaded cargo is discharged. It is preferable to install the relay 3 in these places. Since a mine is very large, a plurality of relays 3 or intermediate relays 6 is disposed near the travel route of the dump truck 20 other than the gas station 2 so as to collect the operation information from the dump truck 20 in operation. Next, the information collection device 10 will be described in more detail.

<Information Collection Device>

Figure 2:
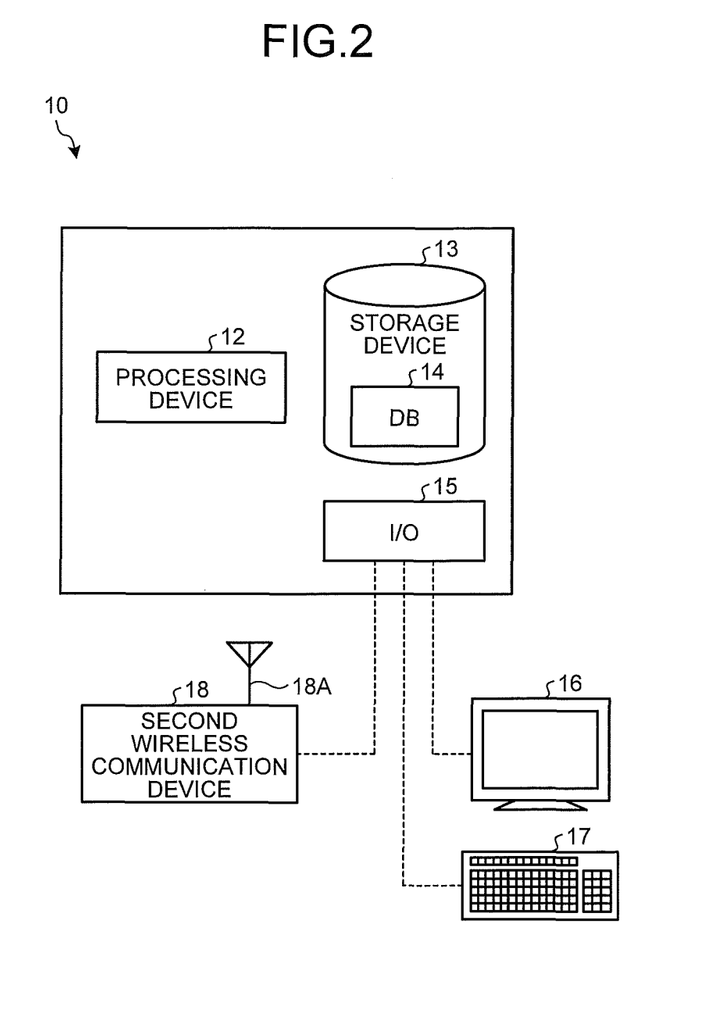
FIG. 2 is a functional block diagram of the information collection device included in the mining machine movement management system according to the first embodiment.

FIG. 2 is a functional block diagram of the information collection device 10 included in the mining machine movement management system 1 according to the first embodiment. The information collection device 10 includes a processing device 12, a storage device 13, and an input/output unit (I/O) 15. The information collection device 10 includes a display device 16, an input device 17, and a second wireless communication device 18 in addition to the input/output unit 15. In the information collection device 10, the display device 16, the input device 17, and the second wireless communication device 18 are connected to the input/output unit 15. The information collection device 10 is configured, for example, as a computer, a server, or a combination thereof. The processing device 12 is, for example, an arithmetic operation device such as a central processing unit (CPU). The storage device 13 is configured, for example, as a random access memory (RAM), a read only memory (ROM), a flash memory, a hard disk drive, or a combination thereof. The input/output unit 15 is used for inputting and outputting (interfacing) information between the processing device 12 and the display device 16, the input device 17, and the second wireless communication device 18 which are externally connected to the processing device 12.

The storage device 13 stores an operation information collection computer program for collecting the operation information of the dump truck 20, a state determination computer program for determining the state of devices such as wireless communication devices of the dump truck 20 and the relay 3, and a communication range database (DB) 14 in which the communication range 7 of the in-vehicle wireless communication device (the first wireless communication device) 27 included in the dump truck 20 is stored. The communication range database 14 is a group of items of, data that represent position information on a communication range where the in-vehicle wireless communication device 27 included in the dump truck 20 can communicate with the relay 3, and for example, the communication range database 14 is described as a set of coordinates for each relay 3. Further, the arrangement location of each relay 3 is measured in advance by a GPS sensor or the like, and data that represents the arrangement location is stored in the communication range database 14.

For example, it is assumed that the inside of a circle having a radius of R around the center of the relay 3 (3A, 3B) illustrated in FIG. 1 is the communication range 7. When an X-Y coordinate system having the origin at the arrangement location of the relay 3 is taken into consideration, the communication range 7 is in the range of $X^2+Y^2 \leq R^2$. The communication range 7 can be obtained through measurements using a measuring instrument capable of measuring radio wave intensity. Moreover, the communication range 7 can also be obtained from the specifications of the relay 3 and the in-vehicle wireless communication device 27. Further, the communication range 7 can also be obtained using both the measurements and the specification of the in-vehicle wireless communication device 27 or the like.

When the information collection device 10 collects the operation information of the dump truck 20, the processing device 12 executes, for example, the following processes. First, the information collection device 10 transmits a position information request command (referred to as a broadcast as necessary) for requesting transmission of the position information of the dump truck 20 to each dump truck 20 at a predetermined point in time (at fixed cycles of time) via the second wireless communication device 18. The dump truck 20 that receives the broadcast among a plurality of dump trucks 20 that operates in a mine, more specifically, the in-vehicle wireless communication device 27 transmits a "response" to the information collection device 10. The information included in the response includes at least the position information of the dump truck itself, measured by a position information detecting device 29 that is mounted on the dump truck 20. The information included in the response may further include at least one of a vehicle speed (speed) and a travel direction of the dump truck 20 and an identifier for identifying the plurality of dump trucks 20.

The dump truck 20 in which the second wireless communication device 18 receives the response, and the processing device 12 can specify the dump truck 20 corresponding to the response can be determined to be present in the communication range 7 at least at the point in time when the second wireless communication device 18 receives the response (the point in time when the dump truck 20 transmits the response). The processing device 12 can collect the operation information as long as the dump truck 20 is present within the communication range 7.

The operation information collection computer program describes commands for executing the above-described processes. When the information collection device 10 collects the operation information of each dump truck 20, the processing device 12 reads the operation information collection computer program and the communication range database 14 from the storage device 13 and executes the commands described in the operation information collection computer program to thereby collect the operation information of the dump truck 20 and store the operation information in the storage device 13.

Moreover, in this embodiment, the information collection device 10 determines at least one of the state of the in-vehicle wireless communication device 27 mounted on each dump truck 20, the state of the relay 3 that relays communication from the in-vehicle wireless communication device 27 (the first wireless communication device 27) to the second wireless communication device 18, and the state (travel route) of each dump truck 20 based on the response to the broadcast. The determination on the state of the in-vehicle wireless communication device 27 means, for example, a process in which the processing device 12 determines the presence of an abnormality in the in-vehicle wireless communication device 27 based on the number of times in which the response to the broadcast can be received. Moreover, the determination on the state of the relay 3 means a process in which the processing device 12 specifies the relay 3 that relays the operation information from the position information of each dump truck 20 and the received time of the operation information, included in the response from each dump truck 20 with respect to the broadcast at the point in time when the second wireless communication device 18 receives the operation information and determines the presence of an abnormality in the specified relay 3 based on the number of times in which the specified relay 3 relays the operation information.

Further, the processing device 12 specifies the relay 3 that relays the operation information as described above, and when the number of times in which the specified relay 3 relays the operation information decreases, the processing device 12 determines the presence of an abnormality in the specified relay 3 or determines (determines the state of the travel route) whether the travel route of the dump truck 20 has changed based on the number of times in which the specified relay 3 receives the response from each dump truck 20 with respect to the broadcast. Moreover, the processing device 12 specifies the relay 3 that relays the operation information as described above, and when an abnormality has not occurs in the specified relay 3, the processing device 12 determines the presence of an abnormality in the in-vehicle wireless communication device 27 based on the operation information and the response to the broadcast.

The state determination computer program describes, for example, commands for executing a process for determining the state of the in-vehicle wireless communication device 27, the relay 3, and the like as described above. When the information collection device 10 determines the state of the in-vehicle information collection device or the like of each dump truck 20, the processing device 12 reads the state determination computer program from the storage device 13 and executes the commands described in the operation information collection computer program to thereby determine the state of the wireless communication device 27 or the like and store the determination result in the storage device 13 and display the same on the display device 16. A supervisor of a mine performs maintenance of devices such as the in-vehicle wireless communication device 27 or an in-vehicle information collection device 30 of each dump truck 20 and maintenance of the relay 3 based on the determination result.

The display device 16 is a liquid crystal display, for example, and displays information necessary when collecting the operation information of each dump truck 20. Moreover, the display device 16 displays the determination result on the state of the devices such as the in-vehicle wireless communication device 27 as described above. The input device 17 is a keyboard, a touch panel, or a mouse, for example, and inputs information necessary when collecting the operation information of each dump truck 20. The second wireless communication device 18 includes the antenna 18A and executes wireless communication with the in-vehicle wireless communication device 27 of each dump truck 20 via the relay 3. Next, the dump truck 20 will be described in more detail.

<Dump Truck>

Figure 3:
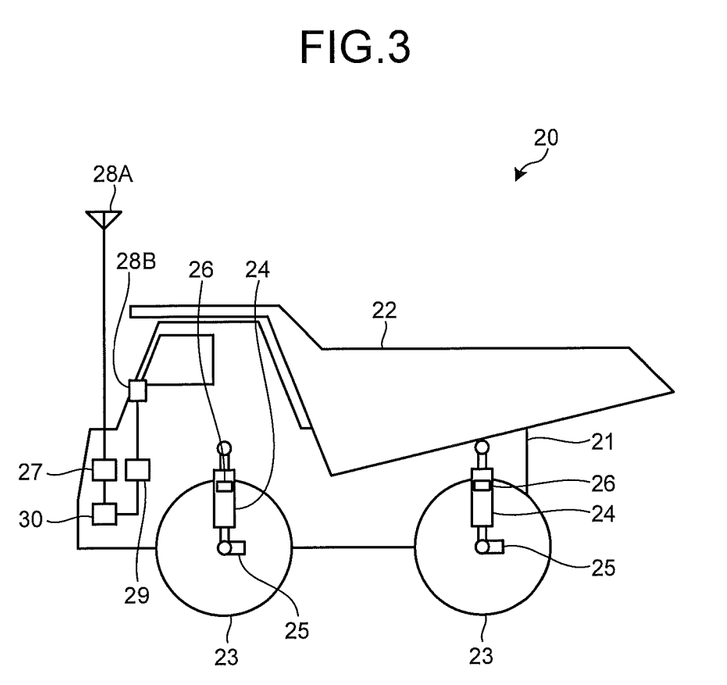
FIG. 3 is a view illustrating a configuration of a dump truck.

FIG. 3 is a view illustrating a configuration of the dump truck 20. The dump truck 20 loads a cargo and discharges the cargo at a desired place. The dump truck 20 includes a vehicle body 21, a vessel 22, wheels 23, a suspension cylinder 24, a rotation sensor 25, a suspension pressure sensor (pressure sensor) 26, the in-vehicle wireless communication device (first wireless communication device) 27 to which the antenna 28A is connected, the position information detecting device (in this embodiment, a GPS receiver) 29 to which the GPS antenna 28B is connected, and the in-vehicle information collection device 30. The dump truck 20 includes various mechanisms and functions which are included in a general delivery machine or a delivery vehicle in addition to the above configurations. In this embodiment, although the dump truck 20 which is steered by the front wheel (wheel 23) is illustrated, instead of the dump truck 20, this embodiment can be applied to an articulated dump truck in which a vehicle body is divided into a front part and a rear part, and these parts are combined by a free joint.

In the dump truck 20, an internal combustion engine such as a diesel engine drives a generator to generate power which drives a motor, and the wheel 23 that is mechanically connected to the output shaft of the motor is driven. As above, although the dump truck 20 is a so-called electric drive type, the driving method of the dump truck 20 is not limited to this. The vessel 22 functions as a cargo stand on which a cargo is loaded and is disposed on an upper portion of the vehicle body 21. The loader 4 such as an excavator loads crushed stone or rocks, soil, or the like is loaded on the vessel 22 as a cargo. The wheel 23 includes a tire and a wheel, and is attached to the vehicle body 21 and is driven when power is transmitted from the vehicle body 21 as described above. The suspension 24 is disposed between the wheel 23 and the vehicle body 21. The vehicle body 21 and the vessel 22, and a load corresponding to the weight of a cargo when the cargo is loaded act on the suspension cylinder 24.

The rotation sensor 25 measures the vehicle speed by detecting the rotation speed of the wheel 23. The suspension pressure sensor (also referred to as a pressure sensor as necessary) 26 detects the load acting on the suspension cylinder 24. That is, the suspension cylinder 24 has hydraulic oil is filled therein and expands and contracts according to the weight of the load. The pressure sensor 26 is provided in each suspension cylinder 24 of the dump truck 20 and can measure the weight (load capacity) of the load by detecting the pressure of the hydraulic oil. The GPS antenna 28B receives radio signals output from a plurality of GPS satellites 5A, 5B, and 5C (see FIG. 1) that form a global positioning system (GPS). The GPS antenna 28B outputs the received radio signals to the position information detecting device 29. The position information detecting device 29 converts the radio signals received by the GPS antenna 28B into electric signals and calculates (measures) its own position information, that is, the position information of the dump truck 20. The in-vehicle wireless communication device 27 performs wireless communication with the relay 3 illustrated in FIG. 1 via the antenna 28A. The in-vehicle wireless communication device 27 is connected to the in-vehicle information collection device 30. With such a structure, the in-vehicle information collection device 30 transmits and receives various items of information to and from the information collection device 10 via the antenna 28A. Next, the in-vehicle information collection device 30 and the peripheral devices thereof will be described.

<In-Vehicle Information Collection Device and Peripheral Devices Thereof>

Figure 4:
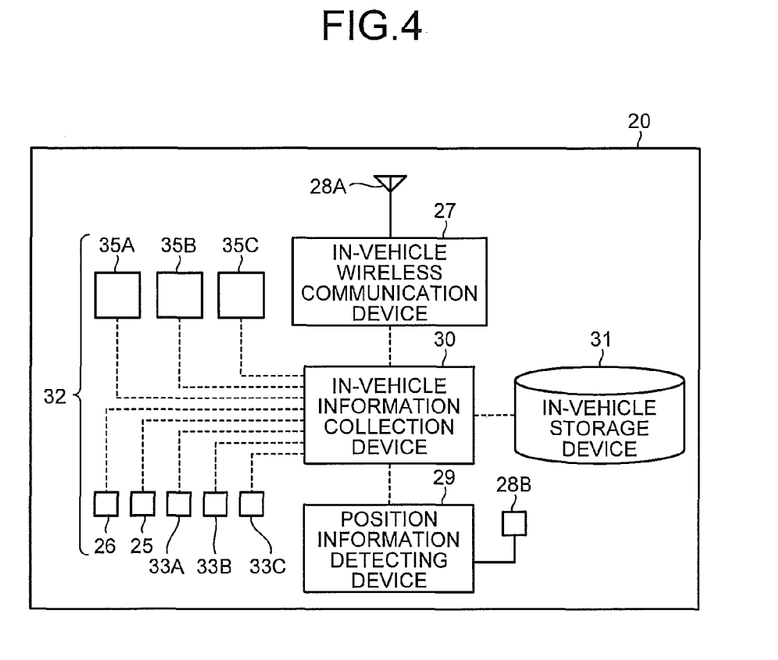
FIG. 4 is a functional block diagram illustrating an in-vehicle information collection device and the peripheral devices thereof.

FIG. 4 is a functional block diagram illustrating the in-vehicle information collection device 30 and the peripheral devices thereof. The in-vehicle information collection device 30 included in the dump truck 20 is connected to an in-vehicle storage device 31, the in-vehicle wireless communication device 27, the position information detecting device 29, and a mining machine information acquisition device 32. The in-vehicle information collection device 30 is a computer in which a central processing unit (CPU) and a memory are combined, for example. The in-vehicle information collection device 30 collects the operation information on the operation state of the dump truck 20 from the mining machine information acquisition device 32.

The in-vehicle storage device 31 is configured as a random access memory (RAM), a read only memory (ROM), a flash memory, a hard disk drive, or a combination thereof, for example. The in-vehicle storage device 31 stores a computer program that describes commands for causing the in-vehicle information collection device 30 to collect the operation information. The in-vehicle information collection device 30 reads the computer program, acquires the operation information from the mining machine information acquisition device 32 at a predetermined point in time, and temporarily stores the operation information in the in-vehicle storage device 31. Here, the predetermined point in time means a predetermined cycle in the case of monitoring the state such as an engine water temperature that is monitored normally, and means an occurrence time when a state (for example, an abnormal increase in the hydraulic oil temperature) that indicates an abnormality occurs. In this case, the in-vehicle information collection device 30 may perform statistical processing for obtaining a mean value, a maximum frequency, or a standard deviation with respect to the same items of information.

The in-vehicle information collection device 30 transmits the collected operation information to the information collection device 10 via the in-vehicle wireless communication device 27 in response to a request from the information collection device 10 illustrated in FIG. 2. Moreover, the in-vehicle information collection device 30 acquires the position information of the dump truck 20 from the position information detecting device 29 and transmits information on the vehicle speed and the travel direction at a place corresponding to the position information to the information collection device 10 illustrated in FIG. 2 via the in-vehicle wireless communication device 27. The vehicle speed may be detected by the position information detecting device 29 and may be detected by the vehicle speed sensor (a sensor such as the rotation sensor 25) mounted on the dump truck 20. The travel direction may be obtained from a change in the position information in a predetermined period, for example, and an acceleration sensor may be provided to detect the direction of acceleration which may be used as the travel direction. Both methods may be combined to obtain the travel direction.

The mining machine information acquisition device 32 includes the rotation sensor 25, the pressure sensor 26, an oil pressure sensor 33A that detects a change in the pressure of hydraulic oil of a hoist cylinder that lifts the vessel 22, a sensor 33B that detects an operation of a dump level that a driver operates to lift the vessel 22, a fuel sensor 33C, and the like. Moreover, in addition to various sensors, the mining machine information acquisition device 32 further includes various controllers such as an engine controller 35A, a motor controller 35B, and a hydraulic controller 35C that acquire information such as output signals of the sensors or instruction signals generated according to the operation of an operator on an accelerator to control the engine of the dump truck 20. The in-vehicle information collection device 30 collects the information obtained from these sensors and controllers as the operation information of the dump truck 20. Next, an example of control (state determination control) according to this embodiment in which the state monitoring system 1 determines the state of the in-vehicle wireless communication device 27, the relay 3, and the like will be described.

<State Determination Control>

Figure 5:
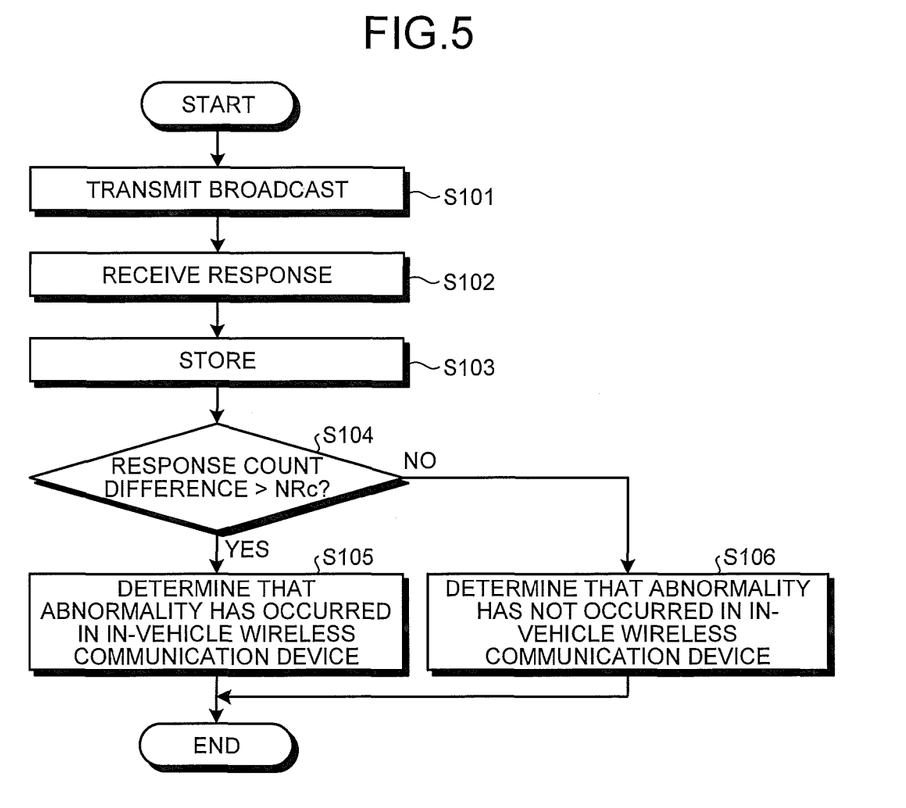
FIG. 5 is a flowchart illustrating the flow of state determination control according to the first embodiment.
Figure 6:
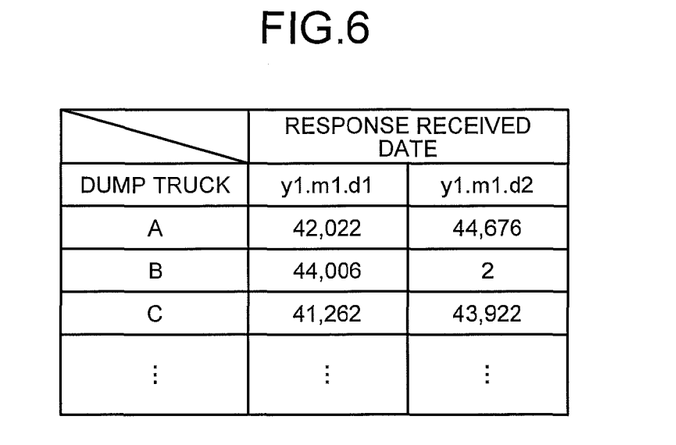
FIG. 6 is a view illustrating an example of an aggregation table of a response count with respect to a broadcast.

FIG. 5 is a flowchart illustrating the flow of state determination control according to the first embodiment. FIG. 6 is a view illustrating an example of an aggregation table of a response count with respect to a broadcast. The state determination control according to this embodiment allows the information collection device 10 installed in a management facility of a mine to collect the operation information from each dump truck 20 which is a mobile vehicle via wireless communication and collect the presence of an abnormality in the in-vehicle wireless communication device 27. In step S101, the information collection device 10 transmits a broadcast to each dump truck 20.

The dump truck 20 in which the in-vehicle wireless communication device 27 receives the broadcast transmits a response to the information collection device 10 via the antenna 28A. The dump truck 20 in which the in-vehicle wireless communication device 27 has not receive the broadcast does not transmit a response to the information collection device 10. The broadcast is set so as to be transmitted at a predetermined cycle, specifically at a relatively short cycle (for example, once in one second). If devices such as the in-vehicle wireless communication device 27 and the relay 3 operate normally, the number of responses corresponding to the number of broadcasts are transmitted to the information collection device 10 from all dump trucks 20 (more specifically, the in-vehicle information collection devices 30) that operate in the mine.

In step S102, the second wireless communication device 18 connected to the information collection device 10 via the relay 3 or the intermediate relay 6 receives the response transmitted from the in-vehicle wireless, communication device 27, and the response is transmitted to the information collection device 10. Subsequently, the flow proceeds to step S103, and the information collection device 10 stores the received response in the storage device 13. In this case, as illustrated in FIG. 6, the information collection device 10 aggregates the number of times (that is, a response count) in which the second wireless communication device 18 was able to receive the response on a daily basis and stores the number in the storage device 13 in correlation with each dump truck 20. For example, FIG. 6 illustrates that 42,022 responses are received from the dump truck 20 indicated by "A" on the day of y1.m1.d1.

Subsequently, the flow proceeds to step S104, and the information collection device 10 obtains an absolute value (response count difference) of the difference from the value of the previous day, of a daily response count of each dump truck 20 and compares the response count difference with a predetermined threshold value NRc. The predetermined threshold value NRc is used for determining an abnormality in the in-vehicle wireless communication device 27, and for example, can be set to a value half the response count of the previous day or to a mean value in a predetermined period before the previous day. Moreover, the predetermined threshold value NRc may be set from a statistical value, an empirical value, or the like. The predetermined threshold value is stored in advance in the storage device 13. In this embodiment, the predetermined threshold value NRc is set to a value half the response count of the previous day. In step S104, the response count on one day, may be compared with a predetermined threshold value rather than the response count difference.

In the example illustrated in FIG. 6, the response count differences (differences between the response counts on the days of y1.m1.d1 and y1.m1.d2) for the dump trucks A and C are 2,654 and 2,660, respectively, and the predetermined threshold values NRc (in the case where a value half the response count on the previous day is used as the threshold value NRc) are 21,011 and 20,631, respectively. In contrast, the response count difference (difference between the response counts on the days of y1.m1.d1 and y1.m1.d2) for the dump truck B is 44,004, and the predetermined threshold value NRc (in the case where a value half the response count on the previous day is used as the threshold value NRc) is 22,003. From this result, it can be understood that the response count difference (44,004) for the dump truck B is larger than the predetermined threshold value NRc (22,003).

When the response count difference is larger than the predetermined threshold value NRc (Yes in step S104), the flow proceeds to step S105. When the response count difference is equal to or smaller than the predetermined threshold value NRc (No in step S104), the flow proceeds to step S106. In step S105, the information collection device 10 determines that an abnormality has occurred in the in-vehicle wireless communication device 27 of the dump truck 20 (in this example, the dump truck B) in which the response count difference is larger than the predetermined threshold value NRc. In this case, for example, the information collection device 10 displays the fact on the display device 16 illustrated in FIG. 2 in the form of a message or an error mark so that the supervisor can recognize the in-vehicle wireless communication device 27 of the dump truck 20 in which an abnormality has occurred. In step S106, the information collection device 10 determines that the in-vehicle wireless communication device 27 of the dump truck 20 (in this example, the dump trucks A and C) in which the response count difference is equal to or smaller than the predetermined threshold value NRc is normal.

In this manner, since the information collection device 10 determines the presence of an abnormality in the in-vehicle wireless communication device 27 based on the response count with respect to the broadcast, it is possible to understand whether wireless communication between each dump truck 20 and the management facility is performed satisfactorily. That is, the information collection device 10 can monitor the state of devices such as the in-vehicle wireless communication device 27 used in a mine. As a result, when an abnormality occurs in the in-vehicle wireless communication device 27 of the dump truck 20, it is possible to take countermeasures early to recover the mining machine movement management system 1 quickly. Thus, it is possible to collect the operation information stably and to suppress a decrease in the productivity of a mining machine operation field. Since the dump trucks 20 used in mines operate under harsh conditions such as dust, vibration, or wind and rain, there is a possibility that an abnormality such as a trouble may occur in the in-vehicle wireless communication device 27. Thus, the state monitoring system 1 according to this embodiment is effective.

Moreover, since the dump truck 20 can inform the supervisor of the state of the in-vehicle wireless communication device 27 by transmitting a response to the broadcast, it is not necessary to provide a new monitoring means or an abnormality determination means to the dump truck 20. As a result, since a factor that decreases reliability associated with durability is not added to the in-vehicle wireless communication device 27 that is used under harsh conditions, it is possible to secure predetermined reliability associated with durability. From this respect, the state monitoring system 1 according to this embodiment is ideal for the dump truck 20 that includes devices such as wireless communication devices used in mines.

In this embodiment, the information collection device 10 detects the operation state of the dump truck 20 and the state of the in-vehicle wireless communication device 27 based on the operation information or the response transmitted from the dump truck 20. Thus, it is not necessary to provide the dump truck 20 with a new monitoring means or an abnormality determination means for monitoring the operation state of the dump truck 20 or the state of the in-vehicle wireless communication device 27. Moreover, for example, even when the position of the relay 3 is changed with a change in the travel route in a mine so that the communication range 7 is changed, the information collection device 10 can understand the operation state of the dump truck 20 and the state of the in-vehicle wireless communication device 27 by updating the communication range database 14. As a result, in a case where the layout (a layout including the travel route, the position of a loading area, the position of a discharge area, and the like) of a mine is changed so that the arrangement location of the relay 3 is changed and a case where the configuration of the state monitoring system 1 is changed, the state monitoring system 1 according to this embodiment can cope up with these cases relatively easily. The same is true for the following embodiment.

Second Embodiment

In the first embodiment, a state monitoring system (state determination control) for wireless communication devices and information collection devices, for determining the presence of an abnormality in the in-vehicle wireless communication device 27 of the dump truck 20 has been described. This embodiment relates to a state monitoring system 1 capable of monitoring the state of devices such as wireless communication devices in a more detail and determining whether the travel route is changed or not. That is, it is possible to determine the presence of an abnormality in the relay 3 and determine whether a communication failure is caused by a change in the travel route. Next, the state monitoring system 1 according to this embodiment will be described.

Figure 7:
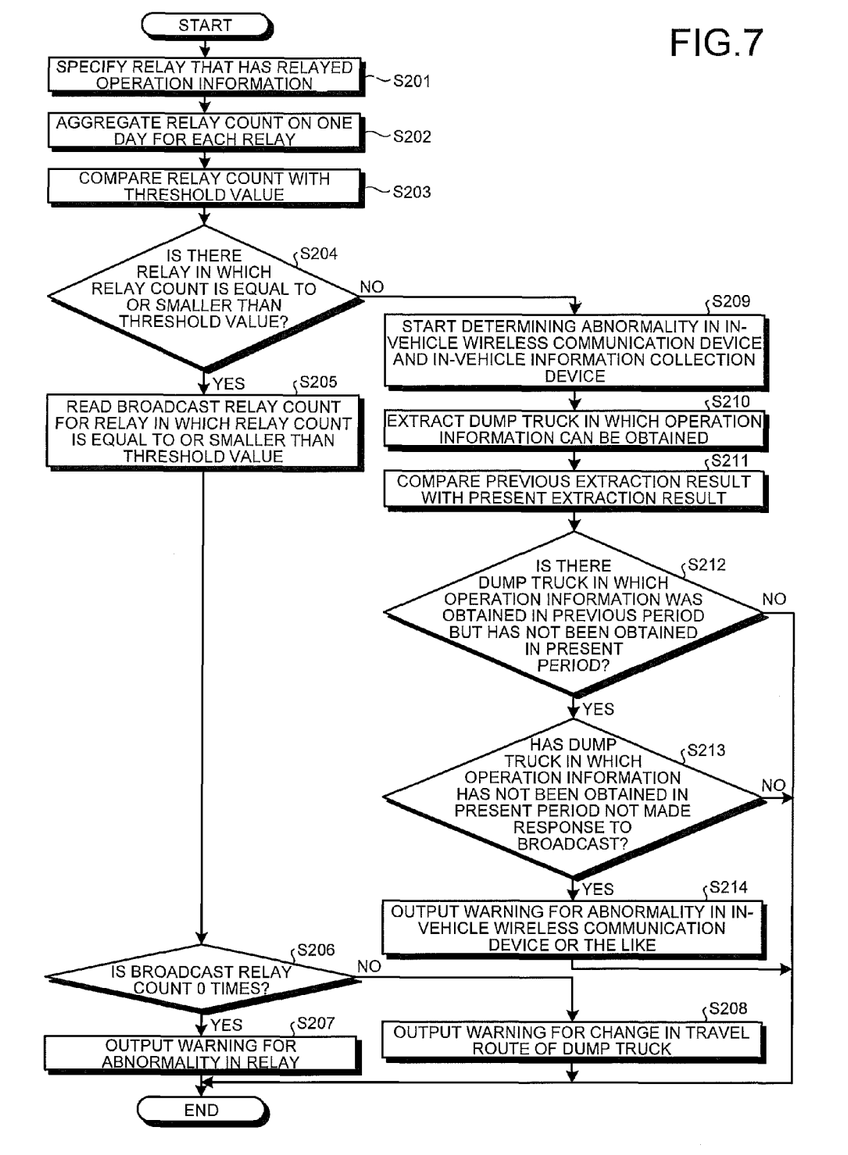
FIG. 7 is a flowchart illustrating the flow of state determination control according to a second embodiment.
Figure 8:
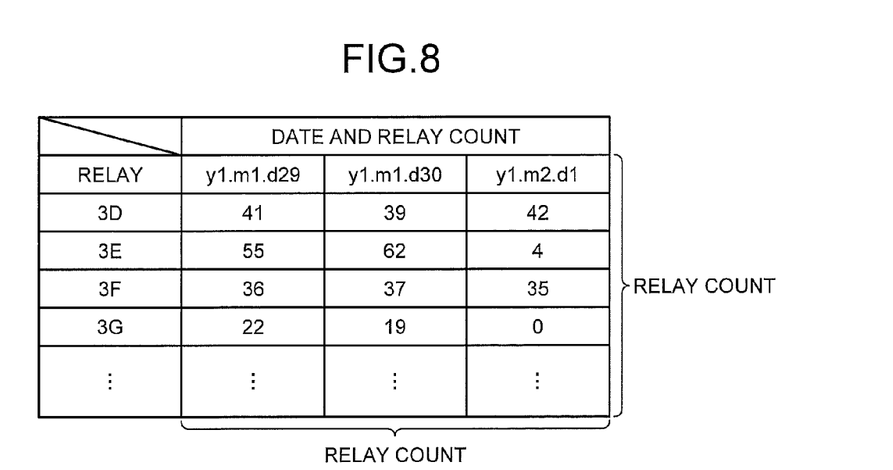
FIG. 8 is a view illustrating an example of an aggregation table of the number (relay count) of times in which a relay relays operation information.
Figure 9:
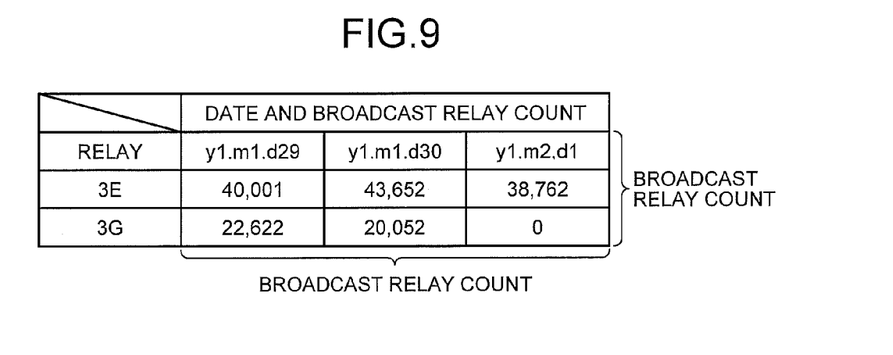
FIG. 9 is a view illustrating an example of an aggregation table of the number (broadcast relay count) of times in which a relay relays a broadcast.
Figure 10:
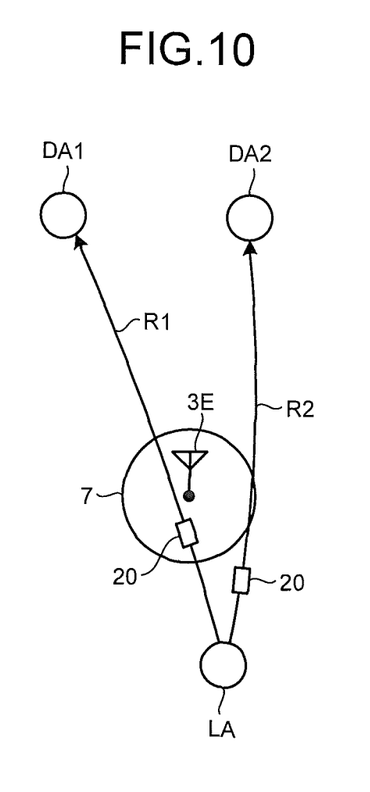
FIG. 10 is a view illustrating an example in which a travel route of a dump truck is changed.

FIG. 7 is a flowchart illustrating the flow of state determination control according to the second embodiment. FIG. 8 is a view illustrating an example of an aggregation table of the number (relay count) of times in which each relay 3 relays the operation information. FIG. 9 is a view illustrating an example of an aggregation table of the number (broadcast relay count) of times in which the relay 3 relays a broadcast. FIG. 10 is a view illustrating an example in which the travel route of the dump truck 20 is changed. As described above, in the second embodiment, the state of the relay 3, the state of the travel route of the dump truck 20, and the state of the in-vehicle wireless communication device 27 or the in-vehicle information collection device 30 are determined. In this embodiment, the information included in the response from the in-vehicle information collection device 30 with respect to the broadcast includes time information of the response, and the position information, the vehicle speed, and the moving direction of the dump truck 20. Further, similarly to the first embodiment, the information collection device 10 stores the position information on the arrangement location of each relay 3 or the information (position information, of the communication range) of the communication range 7 of each relay 3 in the storage device 13.

Next, the flow of state determination control will be described with reference to FIG. 7. In this embodiment, the number of times in which each relay 3 relays the operation information of each dump truck 20 is defined as a "relay count," and the number of times in which each relay 3 relays a broadcast from each dump truck 20 is defined as a "broadcast relay count." In step S201, the information collection device 10 compares the position information of the dump truck 20, the time information of the response, and the acquisition time of the operation information, included in the information on the response to the broadcast. Moreover, the information collection device 10 extracts (specifies) the relay 3 at a position close to the position information from the position information of the dump truck 20 at the reception time of the operation information. Since the position information associated with the arrangement location of the relay 3 is stored in advance in the storage device 13, it is possible to extract (specify) the relay 3. The in-vehicle information collection device 30 of the dump truck 20 transmits the operation information to the information collection device 10 via the relay 3. Thus, when the operation information can be transmitted in an optional place where the dump truck 20 operates, the relay 3 of which the communication range 7 includes the place becomes the relay 3 that has relayed the operation information.

Subsequently, the flow proceeds to step S202, and the information collection device 10 aggregates the relay count of the operation information that is relayed by each relay 3 on a daily basis and stores the relay count in the storage device 13. The aggregation time may not necessarily be one day but may be predetermined intervals of time such as every 8 hours, for example. Subsequently, the flow proceeds to step S203, and the relay count of the operation information relayed by each relay 3 on one day is compared with a threshold value of the relay count. The threshold value of the relay count is used for determining the presence of an abnormality in the relay 3, and for example, can be set to a value half the relay count of the previous day or to a mean value in a predetermined period before the previous day. Moreover, the threshold value of the relay count may be set from a statistical value, an empirical value, or the like. The threshold value of the relay count is stored in the storage device 13. In this embodiment, the threshold value NRc of the relay count is set to a value half the relay count of the previous day.

In step S204, when there is the relay 3 in which the relay count is equal to or smaller than the threshold value (Yes in step S204), the flow proceeds to step S205. When there is not the relay 3 in which the relay count is equal to or smaller than the threshold value (No in step S204), the flow proceeds to step S209. For example, in the example illustrated in FIG. 8, a relay 3E has counted (measured) a relay count of 62 times on the day of y1.m1.d30 and has counted (measured) a relay count of 4 times on the day of y1.m2.d1. Moreover, similarly, the relay count for a relay 3G has decreased from 19 times to 0 times. That is, if the threshold value of the relay count is set to "a value half the relay count of the previous day," the relay counts of the relays 3E and 3G have decreased to the threshold value or smaller. Subsequently, in step S205, the information collection device 10 reads the number of times in which the broadcast of the relay 3 (in the case of FIG. 8, the relays 3E and 3G), in which the relay count is equal to or smaller than the threshold value, is relayed, from the storage device 13. Since the relay 3 that has relayed the broadcast can be specified from the position information of the dump truck 20, included in the information on the response to the broadcast, it is possible to count (measure) the number (broadcast relay count) of times in which the specified relay 3 has relayed the broadcast.

Subsequently, in step S206, the information collection device 10 determines whether the broadcast relay count for the relay 3 (a relay in which the relay count of the operation information is equal to or smaller than the threshold value, and in the case of FIG. 8, the relays 3E and 3G) extracted in step S204 is 0 times. For example, it is assumed that the number (broadcast relay count) of times in which the relay 3 (in the case of FIG. 8, the relays 3E and 3G), in which the relay count of the operation information is equal to or smaller than the threshold value, has relayed the broadcast is as illustrated in FIG. 9. Although there is not a large change in the broadcast relay count for the relay 3E even when the days change, the broadcast relay count for the relay 3G changes abruptly on the day of y1.m2.d1, and the relay count reaches 0 times.

In step S206, when the broadcast relay count is 0 times (Yes in step S206), the flow proceeds to step S207, and the information collection device 10 displays a warning for an abnormality on the display device 16, for example, by determining that there is a possibility that an abnormality occurs in such a relay 3 (in the case of FIG. 9, the relay 3E). In step S206, when the broadcast relay count is not 0 times (No in step S206), the flow proceeds to step S208, and the information collection device 10 determines that the travel route of the dump truck 3 has changed and displays a warning for that fact on the display device 16. In this case, the information collection device 10 may display an aggregate value of the position, the vehicle speed, and the moving direction of the dump truck 20, included in the information on the response to the broadcast on the display device 16.

As illustrated in FIG. 10, it is assumed that although the position of the loading area LA is not changed, the location of the discharge area DA is changed from DA1 to DA2 when the day of y1.m1.d30 in FIG. 9 is changed to the day of y1.m2.d1. In this case, when the location of the discharge area DA is DA1, a travel route R1 of the dump truck 20 crosses a large area of the communication range 7 of the relay 3E. Thus, since it is possible to secure a sufficient communication period necessary for communication of the operation information to be transmitted even when the dump truck 20 is traveling, as illustrated in FIG. 8, the relay count of the operation information of the relay 3E maintains approximately the same values before the day of y1.m1.d30.

When the location of the discharge area DA is changed from DA1 to DA2, a travel route R2 of the dump truck 20 goes through a portion near the outer side of the communication range 7 of the relay 3E. Thus, although it is possible to secure a communication period necessary for communicating the response to the broadcast when the dump truck 20 is traveling, it is not possible to secure a communication period necessary for communicating the operation information to be transmitted. Moreover, among the directions of the travel routes R1 and R2 in the vicinity of the communication range 7, the latter does not go toward the relay 3E. That is, although the dump truck 20 on the travel route R1 travels toward the center of the communication range 7, the dump truck 20 on the travel route R2 travels toward the outer side of the circle indicated by the communication range 7. When the directivity of wireless communication and the travel direction of the dump truck 20 are taken into consideration, the directivity of communication with the relay 3E, for the dump truck 20 traveling on the travel route R2 is lower than that of the dump truck 20 traveling on the travel route R1. As a result, there is obtained a result that although the relay count of the operation information of the relay 3E decreases abruptly on the day of y1.m2.d1 as illustrated in FIG. 8, the number (broadcast relay count) of times in which the relay 3E relays the response to the broadcast does not change abruptly even when the day of y1.m1.d30 is changed to the day of y1.m2.d1 as illustrated in FIG. 9.

As described above, according to this embodiment, the presence of an abnormality in the relay 3 and the presence of a change in the travel route of the dump truck 20 are determined based on the facts that the relay 3 relays the response to the broadcast and the operation information and that the operation information requires a longer communication period (relay period) than the response to the broadcast. When the state monitoring system 1 determines that the travel route of the dump truck 20 is changed (step S208), since it is necessary to move the relay 3, the information collection device 10 may display a prompt message on the display device 16 to move the relay 3 to inform the supervisor of the fact.

A method of determining the presence of an abnormality in the relay 3 and the presence of a change in the travel route of the dump truck 20 is not limited to the above-described method. For example, the presence of an abnormality in the relay 3 and the presence of a change in the travel route of the dump truck 20 may be determined based on the vehicle speed of the dump truck 20 when the operation information is transmitted. As an example, a case where although the vehicle speed of the dump truck 20 when the operation information is transmitted is sufficiently low for transmission of the response to the broadcast, the vehicle speed is too fast to transmit the operation information to be transmitted in a period when the dump truck 7 is in the communication range 7 will be considered. In this case, an event in which the information collection device 10 can collect the response to the broadcast but may not collect the operation information may occur. In step S208, the information collection device 10 may determine whether or not to change the travel route of the dump truck 20 based on the information that indicates the vehicle speed of the dump truck 20. That is, although before the travel route is changed, each dump truck 20 travels within the communication range 7 of a certain relay 3 at such a vehicle speed that a communication period necessary for communicating the operation information to be transmitted can be secured, when the travel route is changed so that each dump truck 20 travels through the communication range 7 of the relay 3, and it is difficult to secure a communication period necessary for communicating the operation information to be transmitted, the information collection device 10 determines that the travel route is changed based on a time-sequential change in the vehicle speed and informs of a prompt message to change the relay 3 (step S208).

Next, step S204 will be described. When the relay 3 in which the relay count is equal to or smaller than the threshold value is not extracted (No in step S204), the flow proceeds to step S209, the information collection device 10 starts determining the presence of an abnormality in the in-vehicle wireless communication device 27 and the in-vehicle information collection device 30. In step S210, the information collection device 10 extracts the dump truck 20 in which the operation information can be collected. Subsequently, the flow proceeds to step S211, and the information collection device 10 compares the previous extraction result and the present extraction result for the dump truck 20 in which the operation information can be collected. The previous extraction result means dump trucks in which the operation information can be obtained in a certain period in the past, and the present extraction result means dump trucks in which the operation information can be obtained in the same period as the certain period in the past after the elapse of the certain period. In step S212, the information collection device 10 determines whether there is the dump truck 20 in which the operation information was collected in the previous period but has not been collected in the present period.

When there is the dump truck 20 in which the operation information has not been collected in the present period (Yes in step S212), the information collection device 10 checks the number of responses to the broadcast, for the dump truck 20 in which the operation information has not been collected in the present period. Moreover, in step S213, when the dump truck 20 in which the operation information has not been collected in the present period has not transmitted a response to the broadcast (Yes in step S213), the information collection device 10 determines in step S214 that an abnormality has occurred in at least one of the in-vehicle information collection device 30 and the in-vehicle wireless communication device 27 and displays a warning for the fact on the display device 16. That is, in step S213, the case where the dump truck 20 in which the operation information has not been collected in the present period has not transmitted a response to the broadcast (Yes in step S213) represents a possibility that an abnormality has occurred such that the dump truck 20 was not able to acquire the operation information itself (abnormality in the in-vehicle information collection device 30) or the dump truck 20 was able to collect the operation information but was not able to wirelessly communicate the operation information (abnormality in the in-vehicle wireless communication device 27).

The collecting of the operation information is scheduled in the processing device 12 of the information collection device 10 of the management facility. For example, an instruction signal that instructs to transmit the operation information is transmitted to each dump truck 20 at a fixed time on each day or at predetermined intervals of time, and each dump truck 20 having received the instruction signal transmits the collected operation information to the information collection device 10. Thus, even when there is the dump truck 20 in which the operation information has not been collected in the present period (Yes in step S212), there is a possibility that the operation information could not be collected due to the radio wave state or the like. However, since the broadcast is transmitted to each dump truck 20 at a high frequency (for example, once per second), when the dump truck 20 in which the operation information has not been collected in the present period has not made a response to the broadcast (Yes in step S213), it is reasonable to determine that an abnormality has occurred in the devices on the dump truck 20, more specifically, at least one of the in-vehicle information collection device 30 and the in-vehicle wireless communication device 27. Thus, when the determination result in step S213 is positive (Yes), it is determined that an abnormality has occurred in at least one of the in-vehicle information collection device 30 and the in-vehicle wireless communication device 27. In this manner, by using the determination result on the presence of the response to the broadcast in addition to the determination result on the presence of the collected operation information, it is possible to determine the presence of an abnormality in the devices on the dump truck 20 more accurately.

When there is not the dump truck 20 in which the operation information has not been collected in the present period (No in step S212), or when the dump truck 20 in which the operation information has not been collected in the present period makes a response to the broadcast (No in step S213), it is determined that the in-vehicle information collection device 30 and the in-vehicle wireless communication device 27 operate normally. After that, the state determination control according to this embodiment ends.

In this embodiment, when the state of the relay 3 and the in-vehicle wireless communication device 27 and the like of the dump truck 20 is determined, the number of times in which the relay 3 relays the operation information and the broadcast, the presence of the collected operation information, and the presence of the response to the broadcast from the in-vehicle information collection device 30 are sequentially acquired and used. As a result, in this embodiment, it is possible to determine the presence of an abnormality in the relay 3, the presence of a change in the travel route of the dump truck, and the presence of an abnormality in the in-vehicle wireless communication device 27 and the like. In this manner, in this embodiment, it is possible to understand the state of a mine by monitoring the state of devices such as in-vehicle wireless communication device 27, the in-vehicle information collection device 30, or the relay 3 used in the mine and monitoring the state of the mine (in this example, the travel route of the dump truck 20) accurately. Moreover, when there is an abnormality in the devices used in the mine or there is a change in the state of the mine, since it is possible to obtain information on the occurrence of these events quickly, it is possible to take countermeasures early and to recover the state monitoring system 1 quickly. As a result, it is possible to stably collect the operation information from the in-vehicle information collection device 30. Moreover, by taking countermeasures early, it is possible to suppress a decrease in the productivity of the mine as much as possible.

In mines, since a place (loading area) where crushed stone is excavated by the loader 4 and loaded on the dump truck 20 and a place (discharge area) where the excavated soil or the like is discharged change, the travel route of the dump truck 20 changes according to the change. Thus, even when the relays 3 are disposed in order to collect the operation information of the mining machine such as the dump truck 20 via wireless communication, if the travel route changes, it may be difficult to collect the operation information from the positional relation ^t between the communication range 7 and the dump truck 20. In this embodiment, it is possible to detect a change in the travel route by acquiring and using the relay count of the operation information and the broadcast relay count of the relay 3. Thus, this embodiment is ideal for application to mines in which the travel route of the dump truck 20 changes with the elapse of time.

Moreover, when the relay count or the broadcast relay count of the relay 3 is obtained, since the results on the operation information from the dump truck 20 and the response to the broadcast are used, it is not necessary to provide the relay 3 with a device for measuring the relay count or a means for monitoring the relay 3 and determining an abnormality. Further, since the dump truck 20 only needs to transmit the operation information and the response to the broadcast, it is not necessary to provide a new monitoring means or an abnormality determination means. As a result, since a factor that decreases the reliability associated with durability is not added to the dump truck 20 and the relay 3 as the devices used under harsh conditions, it is possible to secure predetermined reliability associated with durability. From this respect, the state monitoring system 1 according to this embodiment is ideal for the devices used in mines.

REFERENCE SIGNS LIST

1 MINING MACHINE MOVEMENT MANAGEMENT SYSTEM (including state monitoring system, wireless communication device, information collection device, and travel route state monitoring system)
2 GAS STATION
3 DUMP TRUCK
3, 3a, 3b, 3e, 3g RELAY
4 LOADER
5A, 5B, 5C GPS SATELLITE
6, 6A, 6B INTERMEDIATE RELAY
7 COMMUNICATION RANGE
10 INFORMATION COLLECTION DEVICE
12 PROCESSING DEVICE
13 STORAGE DEVICE
14 COMMUNICATION RANGE DATABASE
15 INPUT/OUTPUT UNIT
16 DISPLAY DEVICE
17 INPUT DEVICE
18 SECOND WIRELESS COMMUNICATION DEVICE
18A ANTENNA
20 DUMP TRUCK
21 VEHICLE BODY
22 VESSEL
23 WHEEL
24 SUSPENSION CYLINDER
25 ROTATION SENSOR
26 PRESSURE SENSOR
27 IN-VEHICLE WIRELESS COMMUNICATION DEVICE
28A ANTENNA
28B GPS ANTENNA
29 POSITION INFORMATION DETECTING DEVICE
30 IN-VEHICLE INFORMATION COLLECTION DEVICE
31 IN-VEHICLE STORAGE DEVICE
32 MINING MACHINE INFORMATION ACQUISITION DEVICE

The invention claimed is:

1. A mining machine movement management system comprising:
an in-vehicle information collection device that is mounted on a mining machine to collect operation information on an operation state of the mining machine;
a first wireless communication device that is mounted on the mining machine to perform communication; and
an information collection device that collects the operation information via a second wireless communication device that communicates with the first wireless communication device, wherein
the information collection device transmits a position information request command for requesting transmission of position information about the mining machine to the mining machine at a predetermined point in time via the second wireless communication device, and
the information collection device determines a state of at least one of a device mounted on the mining machine, a relay that relays communication from the first wireless communication device to the second wireless communication device, and a travel route of the mining machine based on a response from the mining machine with respect to the position information request command.

2. The mining machine movement management system according to claim 1, wherein
the information collection device determines an abnormality in the in-vehicle wireless communication device based on the number of times in which the response is received.

3. The mining machine movement management system according to claim 1, wherein
the information collection device specifies a relay that has relayed the operation information from the position information of the mining machine and a received time of the operation information, included in the response at a point in time when the operation state of the mining machine is received, and
the information collection device determines an abnormality in the specified relay based on the number of times in which the specified relay has relayed the operation information.

4. The mining machine movement management system according to claim 3, wherein
when the number of times in which the specified relay has relayed the operation information decreases with time, the information collection device determines presence of an abnormality in the specified relay or presence of a change in the travel route of the mining machine based on the number of times in which the specified relay has relayed the response.

5. The mining machine movement management system according to claim 4, wherein
the information collection device determines whether the travel route of the mining machine has changed based on a change in speed with time of the mining machine.

6. The mining machine movement management system according to claim 3, wherein
when an abnormality has not occurred in the specified relay, the information collection device determines presence of an abnormality in the device mounted on the mining machine based on the operation information and the response.

* * * * *